(12) United States Patent
Tin

(10) Patent No.: US 7,420,706 B2
(45) Date of Patent: Sep. 2, 2008

(54) CHARACTERIZING COLOR INPUT DEVICES WITH WELL-BEHAVED EXTRAPOLATION

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 810 days.

(21) Appl. No.: 10/840,321

(22) Filed: May 6, 2004

(65) Prior Publication Data

US 2005/0248782 A1     Nov. 10, 2005

(51) Int. Cl.
*H04N 1/40* (2006.01)
(52) U.S. Cl. .......................... 358/1.9; 358/2.1
(58) Field of Classification Search ............... 358/1.9, 358/2.1, 517–518, 500, 504, 527; 382/166–167, 382/162
See application file for complete search history.

(56) References Cited

U.S. PATENT DOCUMENTS

| | | | |
|---|---|---|---|
| 4,941,038 A | 7/1990 | Walowit | 358/80 |
| 5,231,663 A | 7/1993 | Earl et al. | 380/18 |
| 5,398,121 A | 3/1995 | Kowalewski et al. | 358/504 |
| 5,652,831 A | 7/1997 | Huang et al. | 395/131 |
| 6,124,944 A | 9/2000 | Ohta | 358/1.9 |
| 6,360,006 B1 | 3/2002 | Wang | 382/162 |
| 6,459,425 B1 | 10/2002 | Holub et al. | 345/207 |
| 6,671,067 B1 | 12/2003 | Adam et al. | 358/1.6 |

(Continued)

FOREIGN PATENT DOCUMENTS

EP     1 139 656     10/2001

OTHER PUBLICATIONS

Kang, H.R., "Color Scanner Calibration," *J. Imag. Sci. Tech.*, 36:162-170 (1992).
Kang, H.R., *Color Technology for Electronic Imaging Devices*, 272-294, SPIE (1997).

(Continued)

*Primary Examiner*—Thomas D Lee
*Assistant Examiner*—Stephen M Brinich
(74) *Attorney, Agent, or Firm*—Fitzpatrick, Cella, Harper & Scinto

(57) ABSTRACT

The present invention generates a color characterization model for performing transformation from a device-dependent color space of a color device to a device-independent color space. A first set of color measurement data is accessed corresponding to actual measurements of the color device, wherein the actual measurements define a measurement range in the device-dependent color space, and wherein the measurement data includes data point pairs, each data point pair having corresponding device-dependent values and device-independent values. Next, a second set of data point pairs is generated based on a predesignated set of device-dependent values outside the measurement range, by extrapolating device-independent values from the first set of color measurement data. The color characterization model is then determined based on both the first set of color measurement data and the generated second set of data point pairs. Because the color characterization model is determined based on actual measurements and extrapolated values, the color characterization model is well-behaved and does not exhibit significant overshooting or undershooting beyond the measurement range.

18 Claims, 6 Drawing Sheets

U.S. PATENT DOCUMENTS

| | | | |
|---|---|---|---|
| 2002/0063911 A1 | 5/2002 | Hui | 358/525 |
| 2002/0145744 A1 | 10/2002 | Kumada et al. | 358/1.9 |
| 2003/0020703 A1 | 1/2003 | Holub | 345/207 |
| 2003/0112454 A1 | 6/2003 | Woolfe et al. | 358/1.9 |
| 2003/0117457 A1 | 6/2003 | Qiao | 347/43 |
| 2003/0144746 A1 | 7/2003 | Hsiung et al. | 700/28 |
| 2003/0202697 A1 | 10/2003 | Simard et al. | 382/195 |
| 2003/0222991 A1 | 12/2003 | Muammar et al. | 348/222.1 |

OTHER PUBLICATIONS

Draper, N.R. and Smith, H., *Applied Regression Analysis*, 3rd ed., Wiley-Interscience (1998).

Hunt, R.W.G., *Measuring Colour*, 3rd Ed., 63-68, Fountain Press (1998).

Press, W.H, Flannery, B.P., Teukolsky, S.A. and Vetterling W.T., *Numerical Recipes in C: The Art of Scientific Computing*, 2nd Ed., Cambridge University Press (1993).

Shepard, D., "A Two-dimensional Interpolation Function for Irregularly Spaced Data," Proceedings of the 23rd ACM National Conference: 517-524 (1968).

CHARACTERIZING COLOR INPUT DEVICES WITH WELL-BEHAVED EXTRAPOLATION

BACKGROUND OF THE INVENTION

1. Field of the Invention

This invention relates generally to the field of color characterization of color input devices, and specifically relates to generating a color characterization model for performing transformation from a device-dependent color space to a device-independent color space. The color characterization model is based on measured color data points.

2. Description of the Related Art

Traditional color management systems (CMSs) use color characterizations of color input devices to derive color transformations that transform color coordinates between a device-dependent color space that depends on the device, and a device-independent color space. In particular, color characterization for a color input device such as a camera or scanner can be derived by first capturing a target consisting of pre-designated color patches. In a device-dependent color space such as the RGB color space, this results in an RGB bitmap image in which the color of each patch is encoded in an RGB value.

Given a particular target, the color transformation between the device-dependent and device-independent color spaces can be modeled reasonably by polynomials of low degrees. The mathematical method or technique for fitting these polynomials is known as polynomial regression.

A problem arises in the use of polynomial regression based on measured data points. In particular, the use of polynomials tends to overshoot or undershoot beyond the range of the measured data points in a given space. An aspect of this problem is that the device-independent color space typically has constraints associated with it that are imposed by the physical range of the quantities being modeled. In other words, a color in the device-independent color space is typically represented by three coordinates. These three coordinates must satisfy certain constraints and relationships among them to represent a physically possible color. To impose these constraints, domain knowledge rather than the use of purely statistical techniques is required.

If the measured data points from the color input device uniformly fill in the device-dependent color space, the problem of overshooting or undershooting beyond the range of the data points does not arise. However, data points measured from a standard target are rarely distributed uniformly in the device-dependent color space. For instance, measured RGB points typically fill up the inner portions of the RGB cube, or reside in a lower dimensional manifold of the RGB cube. When this happens, the regressed polynomials based on the measured data points are inaccurate in predicting device-independent values beyond the range of the measured data points.

SUMMARY OF THE INVENTION

The present invention addresses the foregoing problems by imposing boundary conditions in the color space of the color device on which polynomial regression is performed. In particular, the invention generates a set of boundary data points that are outside a measurement range of the captured data set, which preferably correspond to axes or corner points of the device-dependent color space of the color input device, and obtains a color characterization based on a best fit to both the actual measurements and the generated data points.

In one aspect, the present invention generates a color characterization model for performing transformation from a device-dependent color space of a color device to a device-independent color space. A first set of color measurement data is accessed corresponding to actual measurements of the color device, wherein the actual measurements define a measurement range in the device-dependent color space, and wherein the measurement data includes data point pairs, each data point pair having corresponding device-dependent values and device-independent values. Next, a second set of data point pairs is generated based on a predesignated set of device-dependent values outside the measurement range, by extrapolating device-independent values from the first set of color measurement data. The color characterization model is then determined based on both the first set of color measurement data and the generated second set of data point pairs.

Preferably, the second set of data point pairs is generated by extrapolating the device-independent values from the first set of color measurement data based on distance and hue angle. Shepard extrapolation may be used. The first set of color measurement data is preferably obtained from a measurement-only color profile corresponding to the color device.

The color characterization model is preferably determined by either multivariate linear regression or nonlinear regression. In addition, the predesignated set of device-independent values preferably corresponds to axes or corner boundaries of the device-dependent color space. The device-dependent color space of the color device is preferably the RGB space. The device-independent color space is preferably any one of the CIELUV space, the CIELAB space or the JAB space. The color characterization model is preferably usable by a color management system.

Because the present invention introduces a set of boundary data points that are outside of the measurement range of the first set of color measurement data, extra penalty is imposed on undesirable polynomials that overshoot or undershoot near device-dependent color space boundaries. In addition, the added data points allow for constraints which are imposed by the physical range of the color space being modeled to be considered.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE INVENTION

Figure 1:
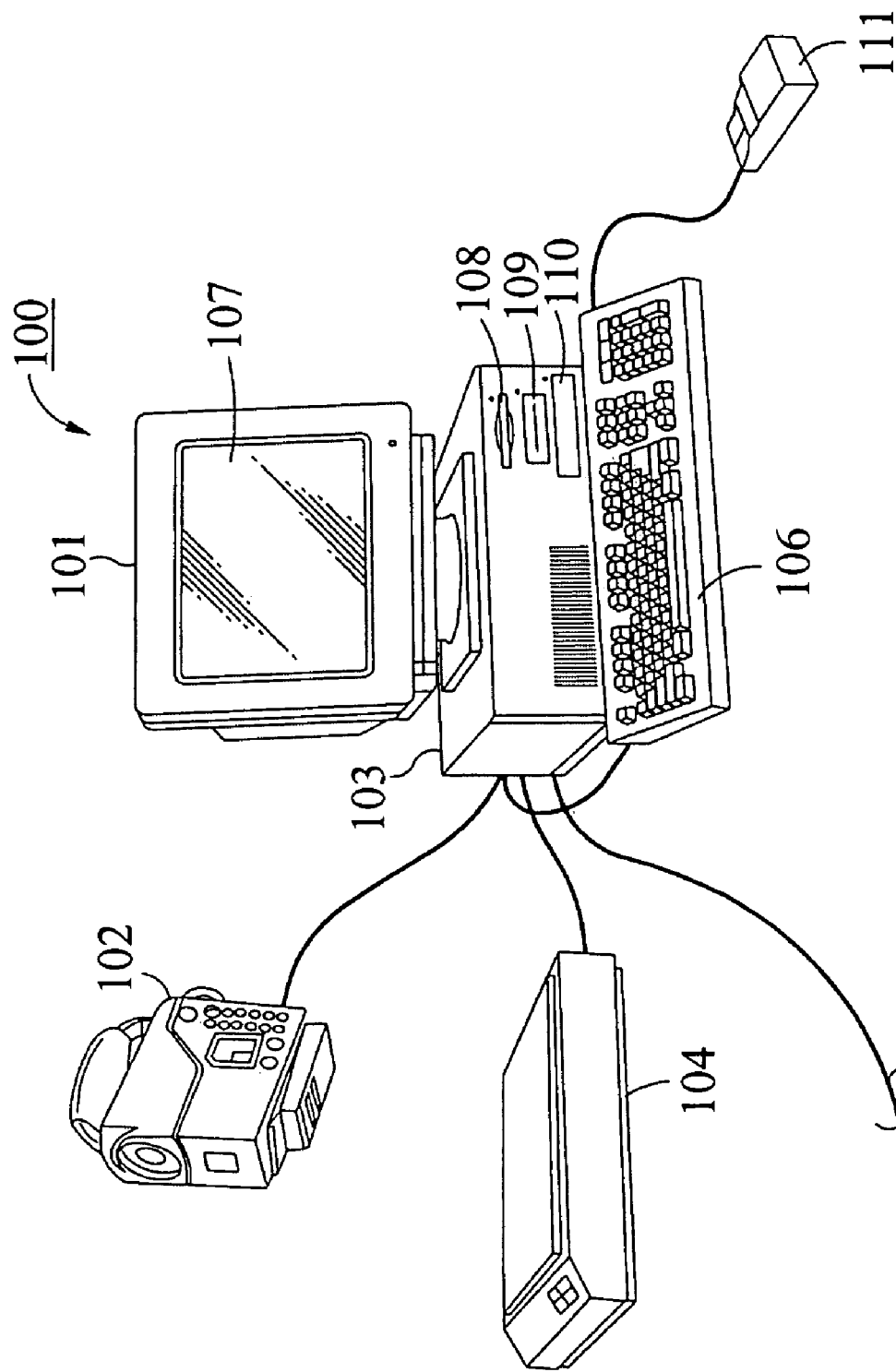
FIG. 1 is a view showing the appearance of one embodiment of the invention.

Referring to FIG. 1, a view showing the exterior appearance of one embodiment of the invention is shown. Specifically, FIG. 1 depicts computing equipment 100, which includes host processor 103 comprising a personal computer (hereinafter "PC"). Provided with computing equipment 100 are color monitor 101 including display screen 107 for displaying text and images to a user, keyboard 106 for entering text data and user commands into PC 103, and pointing device 111. Pointing device 111 preferably comprises a mouse, for pointing, selecting and manipulating objects displayed on display screen 107.

Computing equipment 100 includes a computer readable memory medium such as floppy disk drive 108, fixed disk 110, and/or CD-ROM drive 109. Such computer readable memory media allow computing equipment 100 to access information such as image data, computer-executable process steps, application programs, and the like, stored on removable and non-removable memory media. In addition, network access 105 allows computing equipment 100 to acquire information, images and application programs from other sources, such as a local area network or the Internet.

Digital scanner 104 and digital camera 102 are both color input devices for which a color characterization model can be generated according to the present invention. Digital color scanner 104 is provided for scanning documents and images and sending the corresponding image data to computing equipment 100. Digital color camera 102 is provided for sending digital image data to computing equipment 100. Of course, computing equipment 100 may acquire digital image data from other color input devices, such as a digital video camera.

Figure 2:
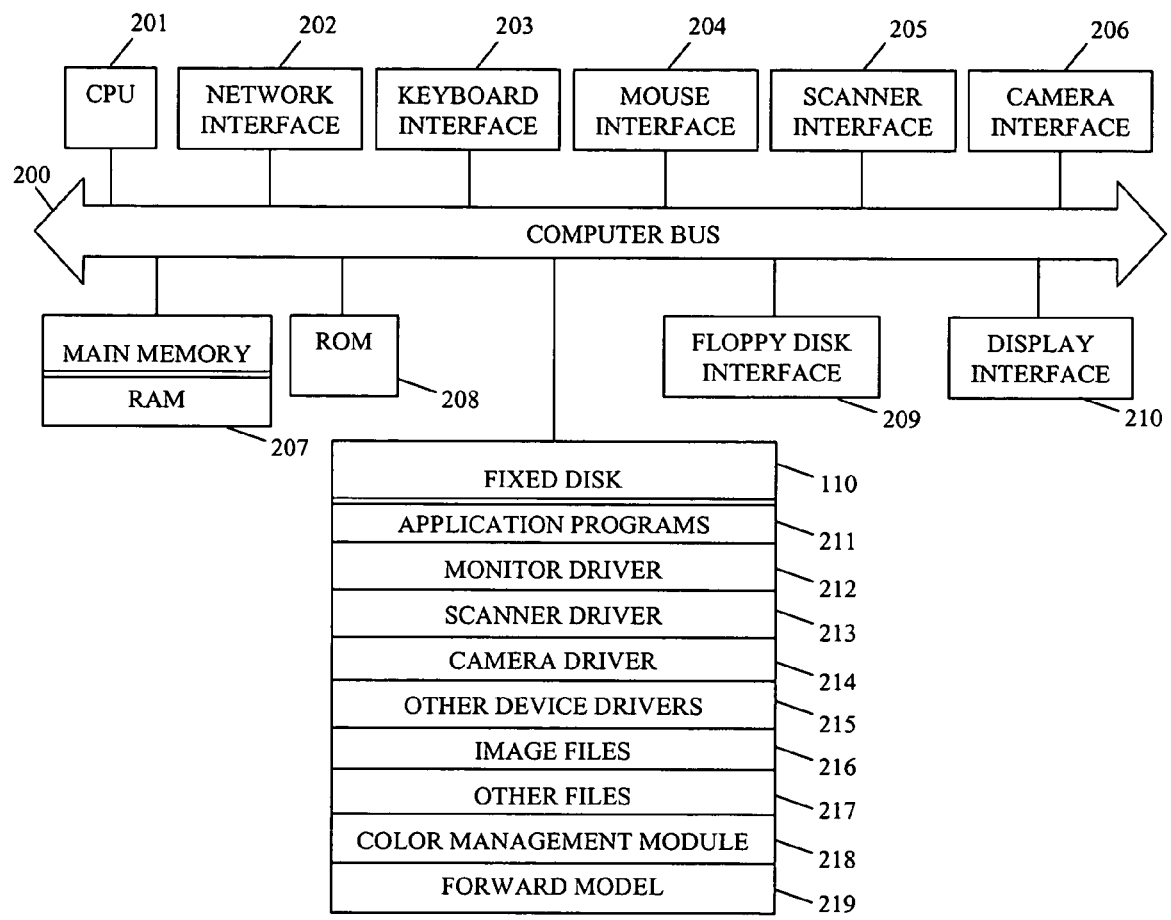
FIG. 2 is a block diagram depicting an example of an internal architecture of the FIG. 1 embodiment.

FIG. 2 is a block diagram illustrating the internal architecture of the FIG. 1 embodiment. As shown in FIG. 2, PC 103 includes network interface 202 for network access 105, and a central processing unit ("CPU") 201, that interfaces with computer bus 200. Also interfacing with computer bus 200 are fixed disk 110, random access memory ("RAM") 207 for use as main memory, read only memory ("ROM") 208, floppy disk interface 209 to allow PC 103 to interface with floppy disk drive 108, display interface 210 for interfacing with monitor 101, keyboard interface 203 for interfacing with keyboard 106, mouse interface 204 for interfacing with pointing device 111, scanner interface 205 for interfacing with scanner 104, and camera interface 206 for interfacing with digital camera 102.

Main memory 207 interfaces with computer bus 200 so as to provide quick RAM storage to CPU 201 during execution of software programs such as the operating system application programs, and device drivers. More specifically, CPU 201 loads computer-executable process steps from fixed disk 110 or other memory media into a region of main memory 207 in order to execute software programs. Data such as color measurement data can be stored in main memory 207, where the data can be accessed by CPU 201 during execution.

Read only memory 208 stores invariant computer-executable program code, or program or process steps, for basic system functions such as basic input and output (I/O), startup, or reception of keystrokes from keyboard 106.

As also shown in FIG. 2, fixed disk 110 stores computer-executable code for application programs 211 such image processing programs like Adobe® Photo shop™.

Fixed disk 110 also stores color management module (CMM) 218. CMM 218 renders color image data from a device-dependent color space to a device-independent color space, and vice versa. CMM 218 uses measurement data from color measurement profiles to generate the device transforms necessary to transform color image data into the color space of the destination color image data.

Forward model 219 is a data structure by which color behavior of a color device is modeled, and performs the transformation from the device-dependent color space of a color input device to a device-independent color space. Forward model 219 can be embodied into a single device driver such as scanner driver 213 or camera driver 214. The generation of forward model 219, being the color characterization model for performing transformation from a device-dependent color space of a color input device to a device-independent color space, is described in more detail below.

It is also possible to implement CMM 218 according to the invention as a dynamic link library ("DLL"), or as a plug-in to other application programs such as image manipulation programs like the Adobe® Photoshop™ image manipulation program, or as part of scanner driver 213 or camera driver 214.

Fixed disk 110 further stores computer-executable code for monitor driver 212, scanner driver 213, camera driver 214, other device drivers 215, image files 216 and other files 217.

FIGS. 1 and 2 illustrate one example of a computing system that executes program code, or program or process steps, configured to generate a color transform using a data structure by which behavior of a color input device is modeled. Other types of computing systems may also be used.

Figure 3:
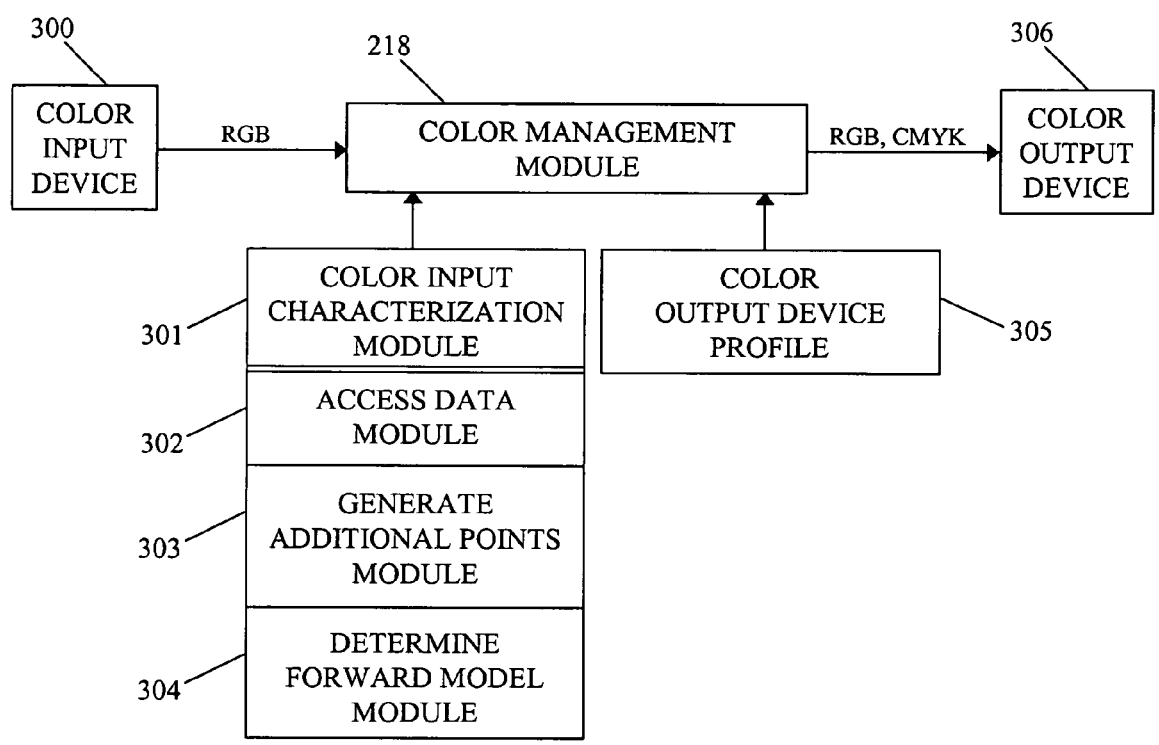
FIG. 3 is a block diagram depicting a color management module which can carry out a method of generating a color characterization model according to the present invention.

With reference to FIG. 3, a block diagram depicting CMM 218, which carries out a method of generating a color characterization model according to the present invention, is shown. CMM 218 contains color input characterization module 301 for characterizing color input device 300, as well as color output device profile 305 for defining a color characterization for color output device 306. CMM 218 operates to accept color values in device-dependent coordinates (such as scanner RGB coordinates), apply the color characterization model and output corresponding color values in the device-independent coordinates (such as Luv). CMM 218 also operates to transform the device-independent coordinates into device-dependent coordinates (such as printer CMYK or monitor RGB) based on color output device profile 305. CMM 218 also operates to perform gamut-mapping between the device-dependent and device-independent color spaces.

Color input characterization module 301 contains process steps for an access data module 302 to access sampled color measurement data of color input device 300, including data point pairs of measured device-dependent values and their corresponding device-independent values. Color input characterization module 301 also contains process steps for a generate additional points module 303 for generating additional points outside a range defined by the actual measurements of the color input device. In addition, color input characterization module 301 contains process steps for a determine forward model module 304 for determining a color characterization model (forward model 219) based on the original color measurement data and the additional generated data points.

Color input characterization module 301, access data module 302, generate additional points module 303, determine forward model module 304, and color output device profile 305 can all be embedded within CMM 218, or can be separate application programs accessed by CMM 218, or can be combined into a single application program accessed by CMM 218. In addition, image data can be input from color input device 300 to CMM 218 using forward model 219. In this embodiment, color input device 300 is scanner 104 or digital camera 102, although a different color input device such as a digital video camera can be used.

Color characterization of color input device 300 generally consists of capturing an image of a target consisting of color patches with known color values in a device-independent color space. Popular choices of such a target include the IT8.7 target and the Color Checker. The result of the capture is an device-dependent bitmap image in which the color of each patch is encoded in a device-dependent value such as RGB. Data point pairs having corresponding RGB values and Luv values make up the color measurement data, and define a measurement range. The measurement range typically does not extend to the boundaries of the RGB color space cube.

These color measurement data are specific to color input device 300, and the goal of calorimetric characterization is to establish an empirical relationship between RGB values and color values in a device-independent color space such as CIELUV. More specifically, a mathematical transformation is sought from RGB to Luv that models as accurately as possible the behavior of color input device 300. Such a transformation can be modeled reasonably well by polynomials of low degrees.

In the preferred embodiment, RGB is the device-dependent color space, Luv is the device-independent color space, and a 20-term cubic polynomial is used as the color characterization model for color input device 300. However, other device-dependent and device-independent color spaces can be used, as well as polynomials with a different number of terms. Given the 20-term cubic polynomial, coefficients $\lambda_i$, $\alpha_i$, $\beta_i$ are sought such that the following equations satisfy the least squares error condition on the data points.

$$\hat{L}(R, G, B) = \lambda_1 + \lambda_2 R + \lambda_3 G + \lambda_4 B + \lambda_5 R^2 + \lambda_6 RG + \lambda_7 RB +$$
$$\lambda_8 G^2 + \lambda_9 GB + \lambda_{10} B^2 + \lambda_{11} R^3 + \lambda_{12} R^2 G + \lambda_{13} R^2 B +$$
$$\lambda_{14} RG^2 + \lambda_{15} RGB + \lambda_{16} RB^2 + \lambda_{17} G^3 + \lambda_{18} G^2 B +$$
$$\lambda_{19} GB^2 + \lambda_{20} B^3$$

$$\hat{u}(R, G, B) = \alpha_1 + \alpha_2 R + \alpha_2 R + \alpha_3 G + \alpha_4 B + \alpha_5 R^2 + \alpha_6 RG +$$
$$\alpha_7 RB + \alpha_8 G^2 + \alpha_9 GB + \alpha_{10} B^2 + \alpha_{11} R^3 + \alpha_{12} R^2 G +$$
$$\alpha_{13} R^2 B + \alpha_{14} RG^2 + \alpha_{15} RGB + \alpha_{16} RB^2 + \alpha_{17} G^3 +$$
$$\alpha_{18} G^2 B + \alpha_{19} GB^2 + \alpha_{20} B^3$$

$$\hat{v}(R, G, B) = \beta_1 + \beta_2 R + \beta_3 G + \beta_4 B + \beta_5 R^2 + \beta_6 RG + \beta_7 RB +$$
$$\beta_8 G^2 + \beta_9 GB + \beta_{10} B^2 + \beta_{11} R^3 + \beta_{12} R^2 G + \beta_{13} R^2 B +$$
$$\beta_{14} RG^2 + \beta_{15} RGB + \beta_{16} RB^2 + \beta_{17} G^3 + \beta_{18} G^2 B +$$
$$\beta_{19} GB^2 + \beta_{20} B^3$$

These polynomials should minimize the sum of squares of errors:

$$SSE = \Sigma(\hat{L}(R_i, G_i, B_i) - L_i)^2 + (\hat{u}(R_i, G_i, B_i) - u_i)^2 + (\hat{v}(R_i, G_i, B_i) - v_i)^2),$$

where the data point pairs are $(R_i, G_i, B_i)$ and $(L_i, u_i, v_i)$. The least squares problem can be stated as solving the following matrix equation, where N is the number of color measurement data points:

$$\begin{pmatrix} 1 & R_1 & G_1 & B_1 & \ldots & G_1 B_1^2 & B_1^3 \\ 1 & R_2 & G_2 & B_2 & \ldots & G_2 B_2^2 & B_2^3 \\ \vdots & \vdots & \vdots & \vdots & \ldots & \vdots & \vdots \\ 1 & R_N & G_N & B_N & \ldots & G_N B_N^2 & B_N^3 \end{pmatrix} \begin{pmatrix} \lambda_1 \\ \lambda_1 \\ \vdots \\ \lambda_{20} \end{pmatrix} = \begin{pmatrix} L_1 \\ L_1 \\ \vdots \\ L_N \end{pmatrix}$$

or, more compactly, $R\Lambda = L$.

Typically, N is larger than 20, so the above-equation is over-determined, necessitating a least squares solution. A closed form for the solution for $\Lambda$ can be given by:

$$\Lambda = (R^T R)^{-1} (R^T L)$$

In practice, the closed form solution is not used. Instead, for a more numerically stable algorithm, the least squares solution is obtained by first decomposing the matrix R into a matrix product (for example, using singular value decomposition), followed by back substitution.

As noted above, the use of polynomials tends to overshoot or undershoot beyond the range of the measured data points in a region beyond the range of the measured data points. An aspect of this problem is that the Luv color space typically has constraints associated with it that are imposed by the physical range of the quantities being modeled. In other words, a color in the device-independent color space is typically represented by three coordinates. These three coordinates must satisfy certain constraints and relationships among them to represent a physically possible color. To impose these constraints, domain knowledge rather than the use of purely statistical techniques is required. The present invention addresses the foregoing by introducing boundary points outside of the measurement range of the color measurement data.

Figure 4:
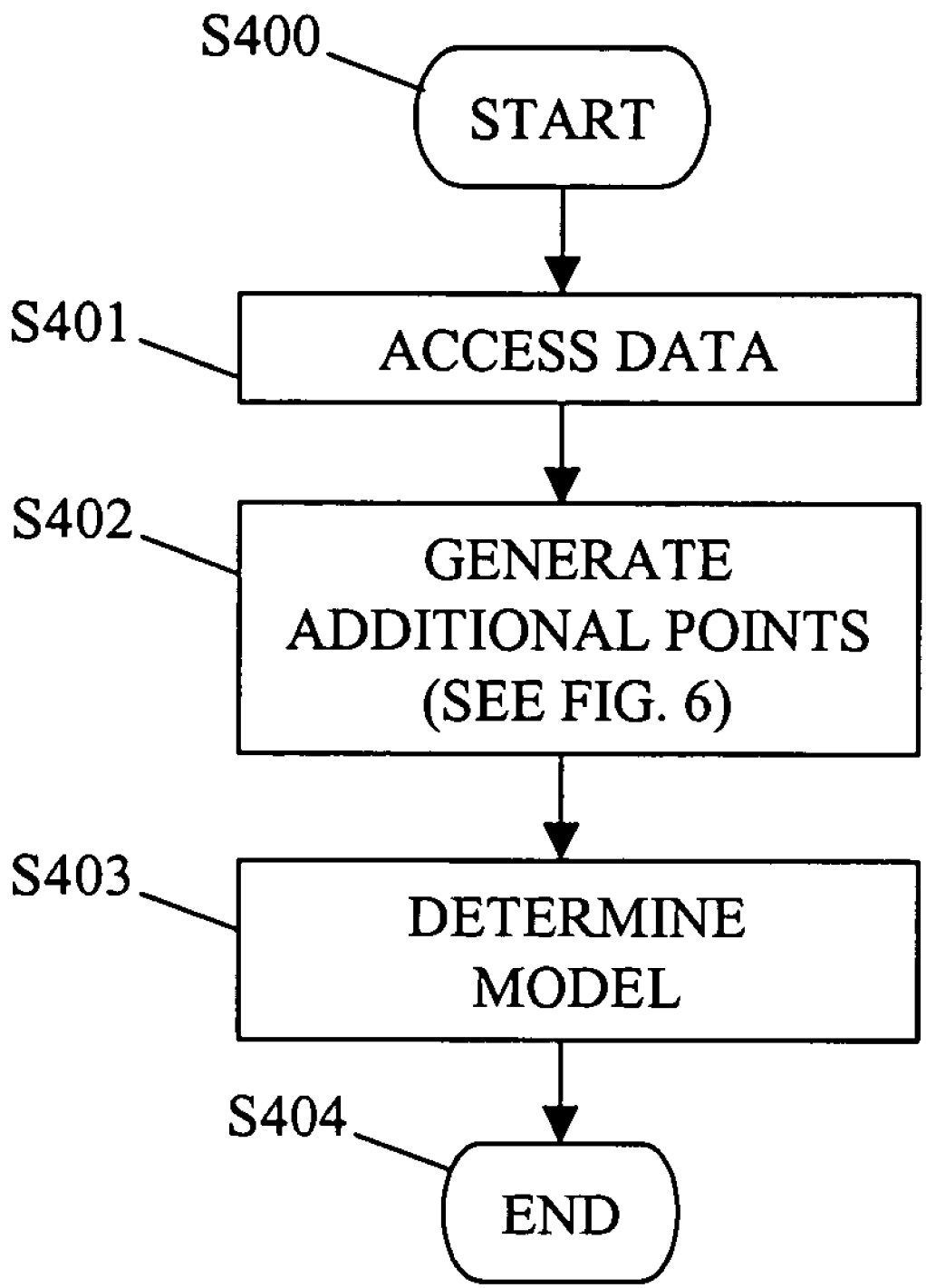
FIG. 4 is a flowchart that illustrates generating a color characterization model for a color input device according to the present invention.

Referring now to FIG. 4, a flowchart that illustrates generating a color characterization model for a color input device according to the present invention is shown. Following start bubble S400, color measurement data is accessed in step S401, additional points are generated in step S402 based on the color measurement data, and forward model 219 is determined using both the color measurement data and the generated data points in step S404. The generation of additional points is described in more detail in relation to FIGS. 5 and 6.

Figure 5:
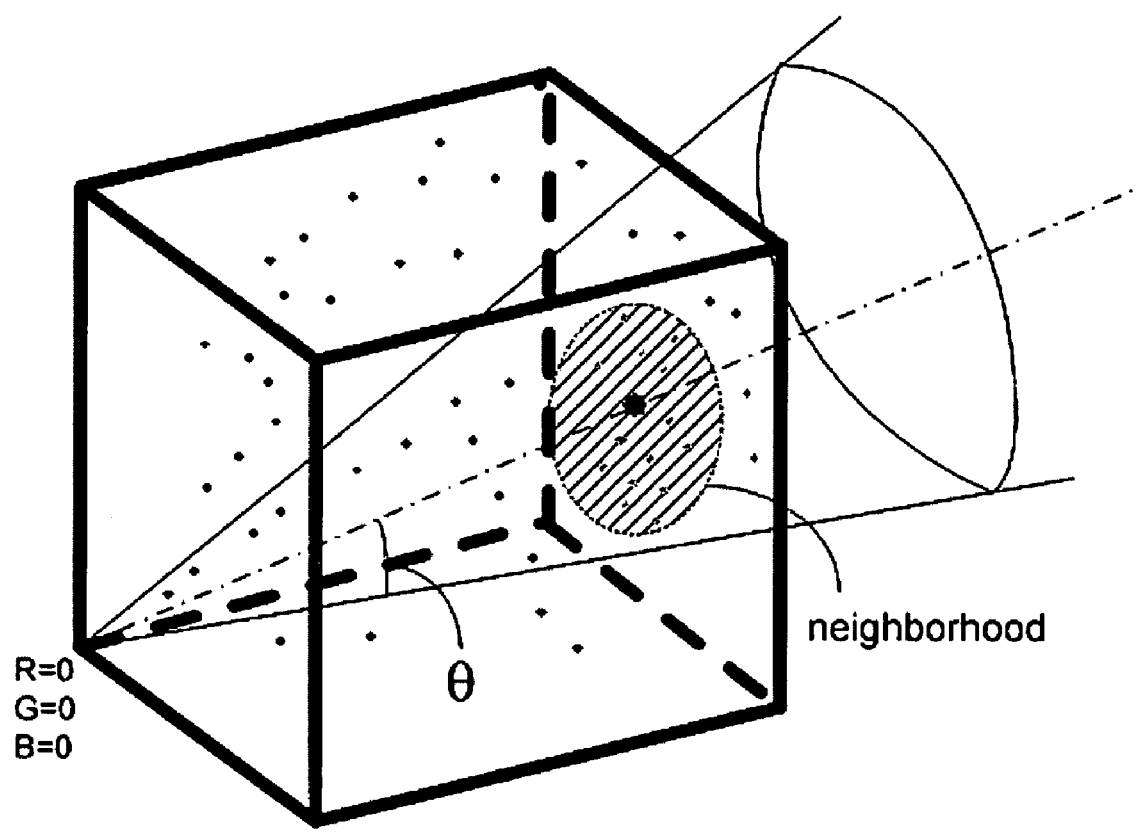
FIG. 5 is a representational diagram depicting the generation of additional data points according to the present invention.

With reference to FIG. 5, a representational diagram depicting the generation of additional data points according to the present invention is shown. In the preferred embodiment, eight control points are introduced corresponding to the corners of the RGB color space cube. These points are typically outside of the measurement range of the color measurement data. If the values for color input device 300 are normalized to unity, then the RGB values for these control points are:

R=0, G=0, B=0
R=0, G=0, B=1
R=0, G=1, B=0
R=0, G=1, B=1
R=1, G=0, B=0
R=1, G=0, B=1
R=1, G=1, B=0
R=1, G=1, B=1

Luv values corresponding to each of the listed (R, G, B) control points are then determined. In determining the Luv values, the hue of the (R, G, B) color should be considered.

Generally, for a given (R, G, B) from above, a weight is assigned to each of the $(R_i, G_i, B_i)$ within a neighborhood of (R, G, B) in the sampled data set. Weight is determined based on two criteria. First, the weight is inversely proportional to the distance between (R, G, B) and ($R_i$, $G_i$, $B_i$). Second, data points having a significantly different hue than the given (R, G, B) point should be discarded, meaning the weight for those data points should be set to 0. To take the hue into account, only points that lie within a cone whose vertex is at (0, 0, 0) are considered, whose axis coincides with the line joining (0, 0, 0) to (R, G, B), and whose semi-vertical angle θ satisfies cos θ=0.9, if such points exist.

Figure 6:
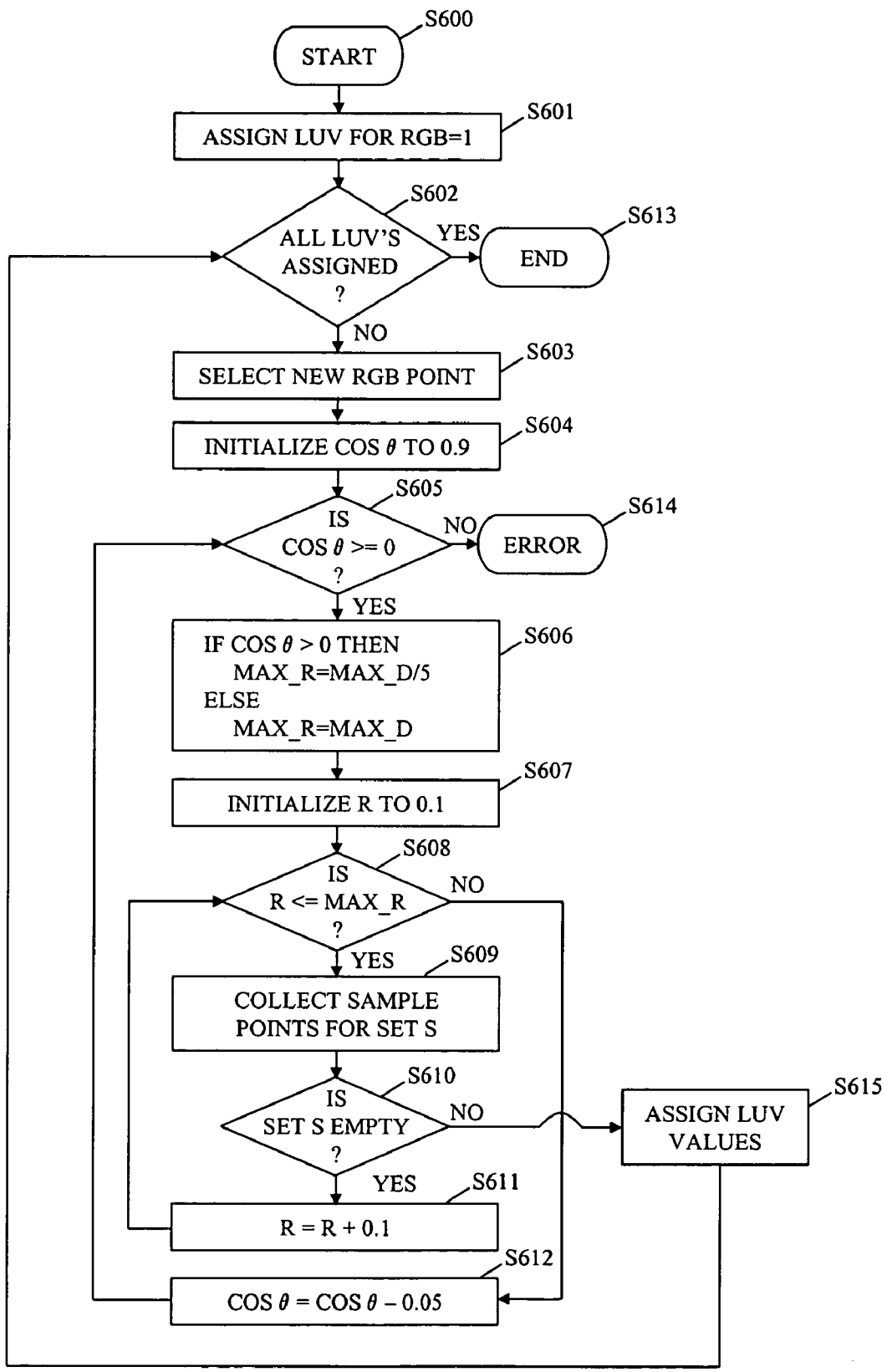
FIG. 6 is a flowchart illustrating the generation of additional data points according to the present invention.

With reference to FIG. 6, a flowchart illustrating the generation of additional data points according to the present invention is shown. Following start bubble S600, the Luv value for white R=G=B=1) is assigned L=100 and u=v=0 in step S601. Then, in step S602, a determination is made as to whether all the Luv values corresponding to the eight corners of the RGB cube have been assigned. If the answer to this inquiry is yes, step S602 is followed by end bubble S613. Otherwise, in step S603, an RGB point without a corresponding Luv value is selected. Cos θ is initialized to 0.9 in step S604, followed by a decision as to whether cos θ is greater than or equal to 0 in step S605. If the answer to this inquiry is no, an error condition occurs in end bubble S614. Otherwise, a maximum radius value MAX_R is initialized to a maximum distance (MAXD) divided by 5 if cos θ exceeds 0, or MAX_R is initialized to MAX_D if cos θ equals 0. MAX_D equals 3 in the case of 1-norm. In step S607, a radius value R is initialized to 0.1. This is followed by an inquiry in step S608 as to whether R is less than or equal to MAX_R. If the answer to this inquiry is no, cos θ is decremented by 0.05 and step S605 is revisited. Otherwise, sample points are collected for a set S in step S609. Then, in step S610, a determination is made as to whether set S is empty. If set S is not empty, an Luv value is calculated based on set S. The calculation of the Luv value is discussed in more detail below. If set S is empty, R is incremented by 0.1 in step S611, and step S608 is revisited. This repeats until set S is not empty.

After yielding a non-empty set S of points ($R_i$, $G_i$, $B_i$) and corresponding ($L_i$, $u_i$, $v_i$), then for each such point, a normalized weight $w_i$ is assigned as follows:

$$h_i = \left(\frac{\max(\text{MAX\_D} - d_i, 0)}{d_i}\right)^2 \text{ where}$$

$$d_i = |R - R_i| + |G - G_i| + |B - B_i|$$

$$w_i = h_i \bigg/ \sum_{j \in S} h_j$$

where $h_i$ is the weight before normalization and satisfies the inverse-distance property, and $d_i$ is the distance of (R, G, B) from ($R_i$, $G_i$, $B_i$).

The extrapolated Luv value for (R, G, B) is then calculated by:

$$L = \sum_{i \in S} w_i L_i$$

$$u = \sum_{i \in S} w_i u_i$$

$$v = \sum_{i \in S} w_i v_i$$

Referring back to FIG. 4, once the additional data points are generated, multivariate linear regression is performed on the N+8 data points (color measurement data points+generated data points). This results in a color characterization model (forward model 219) for input color device 300.

By introducing boundary data points outside of the measurement range of the original color measurement data, extra penalty is imposed on the polynomials that overshoot or undershoot near polynomial boundaries. In addition, the generated data points allow for constraints which are imposed by the physical range of the color space being modeled to be considered.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A method for generating a color characterization model for a color input device, the color characterization model for performing transformation from a device-dependent color space of the color input device to a device-independent color space, the method comprising the steps of:

accessing a first set of color measurement data corresponding to actual measurements of a color target by the color input device, wherein the color target has known color values in the device-independent color space and the actual measurements are obtained by the color input device in the device-dependent color space, wherein the actual measurements define a measurement range in the device-dependent color space, and wherein the measurement data includes data point pairs, each data point pair having corresponding actual measurements and known color values;

generating a second set of data point pairs based on plural device-dependent values outside the measurement range, by extrapolating device-independent values corresponding to the device-dependent values outside the measurement range from the first set of color measurement data; and determining the color characterization model based on both the first set of color measurement data and the generated second set of data point pairs.

2. The method according to claim 1, wherein said generating step comprises extrapolation of device-independent values from the first set of color measurement data based on distance and hue angle.

3. The method according to claim 1, wherein the first set of color measurement data is obtained from a measurement-only color profile corresponding to the color input device.

4. The method according to claim 1, wherein the color characterization model is usable by a color management system.

5. The method according to claim 1, wherein said determining step comprises multivariate linear regression.

6. The method according to claim 1, wherein said determining step comprises nonlinear regression.

7. The method according to claim 1, wherein the plural device-independent values outside the measurement range includes device dependent values at at least one corner point of the device-dependent color space.

8. The method according to claim 1, wherein the plural device-dependent values outside the measurement range correspond to eight corner points of the device-dependent color space.

9. The method according to claim 1, wherein the plural device-dependent values outside the measurement range correspond to at least one axis boundary of the device-dependent color space.

10. The method according to claim 1, wherein said generating step comprises extrapolation using Shepard extrapolation.

11. The method according to claim 1, wherein the device-dependent color space is RGB.

12. The method according to claim 1, wherein the device-independent color space is CIELUV.

13. The method according to claim 1, wherein the device-independent color space is CIELAB.

14. The method according to claim 1, wherein the device-independent color space is JAB.

15. The method according to claim 1, wherein the color input device is a color scanner.

16. The method according to claim 1, wherein the color input device is a digital color camera.

17. A computer-readable storage medium which stores computer-executable process steps, the computer-executable process steps executable by a computer to generate a color characterization model for a color input device, the color characterization model for performing transformation from a device-dependent color space of the color input device to a device-independent color space, said computer-executable process steps comprising process steps executable to perform a method according to any of claims 1 to 16.

18. An apparatus for generating a color characterization model for a color input device, the color characterization model for performing transformation from a device-dependent color space of the color input device to a device-independent color space, the apparatus comprising:

obtaining unit configured to obtaining a first set of color measurement data corresponding to actual measurements of a color target by the color input device, wherein the color target has known color values in the device-independent color space and the actual measurements are obtained by the color input device in the device-dependent color space, wherein the actual measurements define a measurement range in the device-dependent color space, and wherein the measurement data includes data point pairs, each data point pair having corresponding actual measurements and known color values;

generating unit configured to generate a second set of data point pairs based on plural device-dependent values outside the measurement range, by extrapolating device-independent values corresponding to the device-dependent values outside the measurement range from the first set of color measurement data; and determining unit configured to determine the color characterization model based on both the first set of color measurement data and the generated second set of data point pairs.

* * * * *